(12) United States Patent
Chang et al.

(10) Patent No.: US 10,310,633 B2
(45) Date of Patent: Jun. 4, 2019

(54) MOUSE DEVICE

(71) Applicant: Primax Electronics Ltd., Taipei (TW)

(72) Inventors: A-Ming Chang, Taipei (TW);
Chun-Che Wu, Taipei (TW);
Cheng-Chi Hsu, Taipei (TW);
Hung-Bin Wu, Taipei (TW);
Yung-Ming Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 95 days.

(21) Appl. No.: 15/790,211

(22) Filed: Oct. 23, 2017

(65) Prior Publication Data

US 2018/0329525 A1 Nov. 15, 2018

(30) Foreign Application Priority Data

May 12, 2017 (TW) .............................. 106115805 A (51) Int. Cl.
*G06F 1/16* (2006.01)
*G06F 3/0354* (2013.01)

(52) U.S. Cl.
CPC ................................ *G06F 3/03543* (2013.01)

(58) Field of Classification Search
CPC ............... G06F 3/03543; G06F 1/1656; G06F 2203/0332; G06F 2203/0333; G06F 2203/0335
See application file for complete search history.

(56) References Cited

U.S. PATENT DOCUMENTS

| 5,260,696 A * | 11/1993 | Maynard, Jr. ....... | G06F 3/03543 345/157 |
| 5,847,696 A * | 12/1998 | Itoh ..................... | G06F 3/03543 345/163 |
| 5,870,081 A * | 2/1999 | Wu ...................... | G06F 3/03543 345/163 |
| 6,304,249 B1 * | 10/2001 | Derocher .............. | G06F 1/1616 248/118.1 |
| 7,362,309 B2 * | 4/2008 | Chao ................... | G06F 3/03543 345/164 |
| 8,760,861 B2 * | 6/2014 | Lee ...................... | G06F 3/03543 345/163 |
| 9,569,014 B2 * | 2/2017 | Drougge ............. | G06F 3/03543 |
| 2003/0103040 A1 * | 6/2003 | Koike .................. | G06F 3/0312 345/163 |

* cited by examiner

*Primary Examiner* — Ram A Mistry
(74) *Attorney, Agent, or Firm* — Kirton McConkie; Evan R. Witt (57) ABSTRACT

A mouse device includes a casing, a top cover, an adjusting module and a pressing part. The casing is covered by the top cover. The top cover is movable relative to the casing. The top cover includes a saw-toothed plate. The saw-toothed plate is inserted into an inner portion of the casing and contacted with the adjusting module. The pressing part is connected with the adjusting module. When the pressing part is pressed to trigger the adjusting module, the saw-toothed plate is pushed by the adjusting module and the top cover is moved form a first position to a second position. Consequently, a shape of the mouse device is changed. The shape of the mouse device is changeable according to the size of the user's palm.

10 Claims, 8 Drawing Sheets

MOUSE DEVICE

FIELD OF THE INVENTION

The present invention relates to an input device, and more particularly to a mouse device for controlling the movement of a cursor.

BACKGROUND OF THE INVENTION

The widely-used input device of a computer includes for example a mouse device, a keyboard device, a trackball device, or the like. Among these input devices, the mouse device is the most prevailing because it is very easy-to-use for most users. When a mouse device is held by the palm of a user, the user may move the mouse device to control the movement of a cursor shown on a display screen of the computer.

Figure 1:
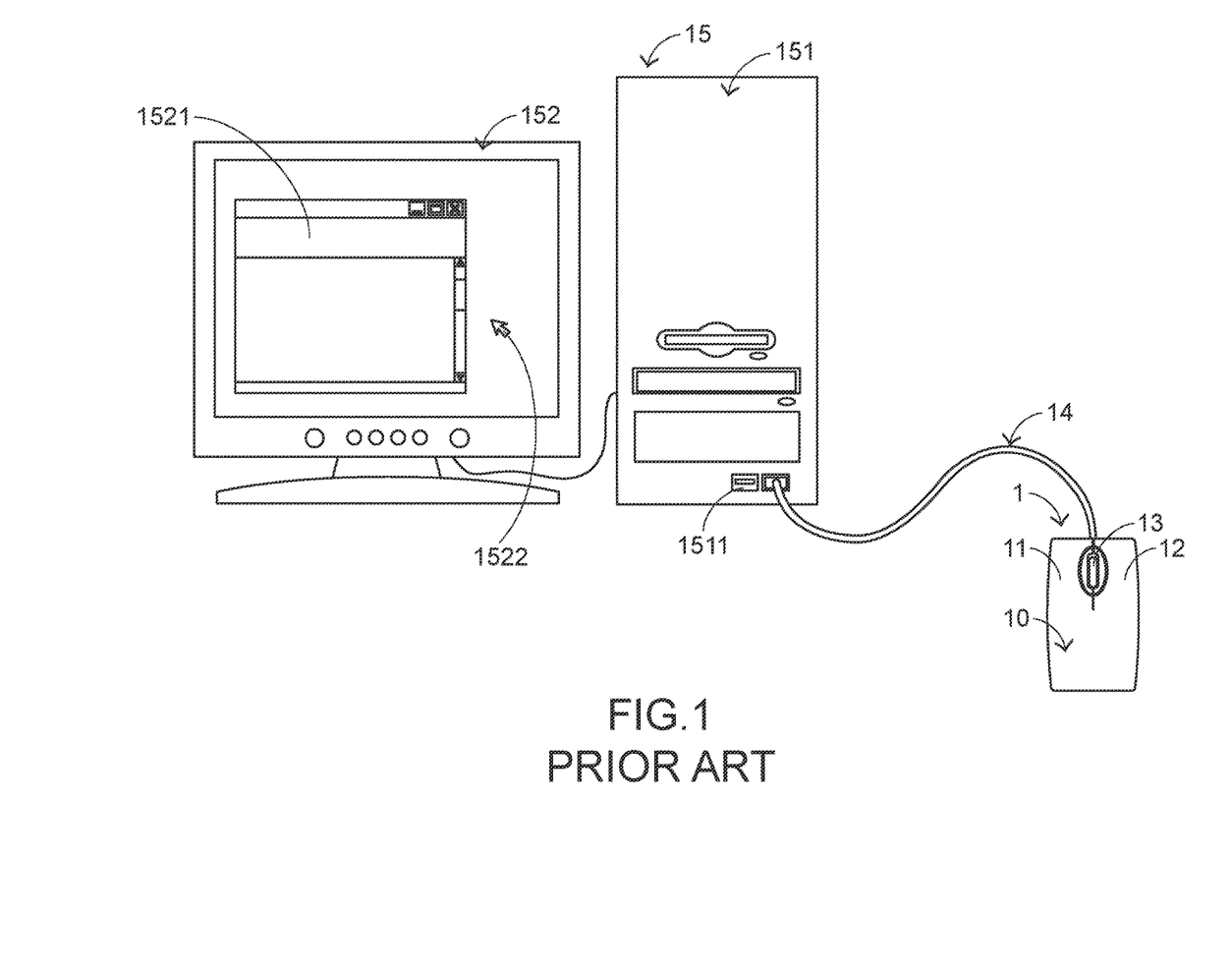
FIG. 1 is a schematic diagram illustrating the connection between a conventional mouse device and a computer system.

Hereinafter, the structure and the function of a conventional mouse device will be illustrated with reference to FIG. 1. FIG. 1 schematically illustrates the connection between a conventional mouse device and a computer system. The computer system 15 comprises a computer host 151 and a display screen 152. The computer host 151 is in communication with a mouse device 1 and the display screen 152. The computer host 151 has a connecting port 1511. A graphic-based window 1521 and a cursor 1522 are shown on the display screen 152. The mouse device 1 is used for controlling the cursor 1522 to have the computer host 151 execute a corresponding command. The mouse device 1 comprises a main body 10, a left button 11, a right button 12, a scroll wheel 13, and a connecting cable 14. The left button 11 is disposed on the main body 10 and located at a left side of the scroll wheel 13. In addition, the left button 11 is exposed outside the main body 10. By pressing down the left button 11, a left button signal is generated. The right button 12 is disposed on the main body 10 and located at a right side of the scroll wheel 13. By pressing down the right button 12, a right button signal is generated. The scroll wheel 13 is disposed within the main body 10 and partially exposed outside the main body 10. By rotating the scroll wheel 13, a corresponding scrolling signal is generated. The connecting cable 14 is connected with the main body 10 and protruded outside the main body 10. When the connecting cable 14 is connected with the connecting port 1511, the communication between the mouse device 1 and the computer system 15 is established.

Generally, for different users, the sizes of the palms and the lengths of the fingers are different. Since the mouse body of the general mouse device has a fixed size, the mouse device may only comply with the palms and fingers of specified users. In other words, the size of the mouse body of the general mouse device fails to comply with the palms and fingers of some other users. If the unsuitable mouse device is used for a long time period, the procedure of operating the mouse device usually incurs unacceptable fatigue of the user's hand. For solving the above drawback, a mouse device with an adjustable shape is introduced into the market. For example, China Patent Publication No. CN203746021 discloses a mouse device with increasable volume. The volume of the mouse device is adjustable according to the size of the palm. However, the mouse device with increasable volume has a very simple structure and is not aesthetically pleasing. Moreover, the shape-changing element of the mouse device is rough. While the shape of the mouse is changed, it is necessary to use a fastening knob to fix the shape-changing element. Consequently, the mouse device with increasable volume is not user-friendly.

Therefore, there is a need of providing a mouse device with an adjustable shape, aesthetically-pleasing appearance and user-friendliness.

SUMMARY OF THE INVENTION

The present invention provides a mouse device with an adjustable shape, aesthetically-pleasing appearance and user-friendliness.

In accordance with an aspect of the present invention, there is provided a mouse device. The mouse device includes a casing, a top cover, an adjusting module and a pressing part. The casing includes a first opening and a second opening. The casing is covered by the top cover. The top cover is movable relative to the casing. The top cover includes a saw-toothed plate that is disposed on an inner surface of the top cover. The saw-toothed plate is penetrated through the first opening and inserted into an inner portion of the casing. The adjusting module is disposed within the casing and connected with the saw-toothed plate. When the saw-toothed plate is moved with the adjusting module, the top cover is correspondingly moved relative to the casing. The pressing part is penetrated through the second opening, exposed outside the second opening and connected with the adjusting module. When the pressing part is pressed to trigger the adjusting module, the top cover is moved to a first position or a second position. Consequently, a shape of the mouse device is changed.

In an embodiment, the adjusting module includes a linkage lever and a coupling mechanism. The linkage lever is connected with the pressing part. While the pressing part is pressed, the linkage lever is moved relative to the casing. A first end of the coupling mechanism is connected with the linkage lever. A second end of the coupling mechanism is connected with the saw-toothed plate. Consequently, the second end of the coupling mechanism is disposed within a first graduation or a second graduation of the saw-toothed plate. While the pressing part is pressed to trigger the adjusting module, the second end of the coupling mechanism is moved from the first graduation to the second graduation or from the second graduation to the first graduation.

In an embodiment, the coupling mechanism includes a transmission element, a movable element and an elastic element. The transmission element is connected with the linkage lever and rotatable relative to the linkage lever. The transmission element includes an accommodation space and a fixing structure. The accommodation space is located near the saw-toothed plate. The movable element is located at the second end of the coupling mechanism and accommodated within the accommodation space. While the movable element is pushed by the saw-toothed plate, the saw-toothed plate is moved within the accommodation space. The elastic element is disposed within the accommodation space and contacted with the movable element. The elastic element provides a first elastic force to the movable element.

From the above descriptions, the present invention provides the mouse device. The movement of the top cover is controlled through the pressing part and the adjusting module. Consequently, the shape of the mouse is adjusted to comply with the requirements of different users. The pressing part and the transmission element, the movable element and the elastic element of the adjusting module are linked with each other. In response to the elastic force of the elastic element, the pressing part is returned to its original position. When compared with the conventional technology, the mouse device of the present invention is aesthetically-pleasing and more user-friendly. In other words, the mouse device of the present invention can overcome the drawbacks of the conventional technology.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the conventional technologies, the present invention provides a mouse device.

Figure 2:
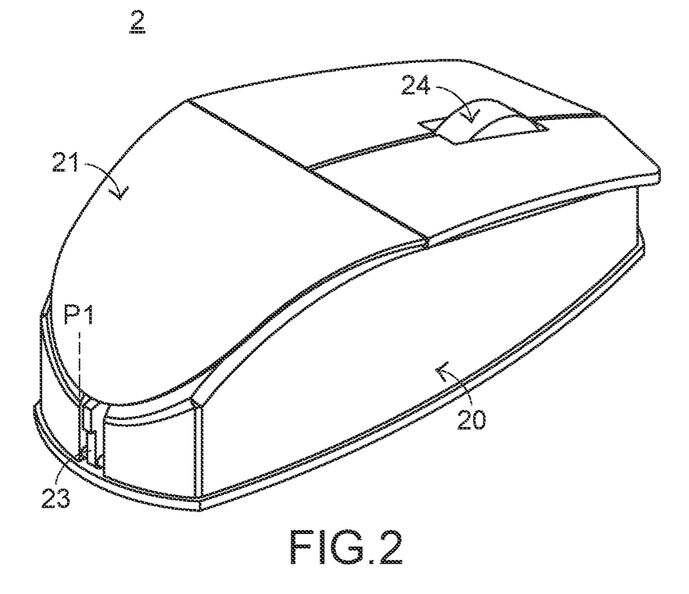
FIG. 2 is a schematic perspective view illustrating a mouse device in a first status according to an embodiment of the present invention.
Figure 3:
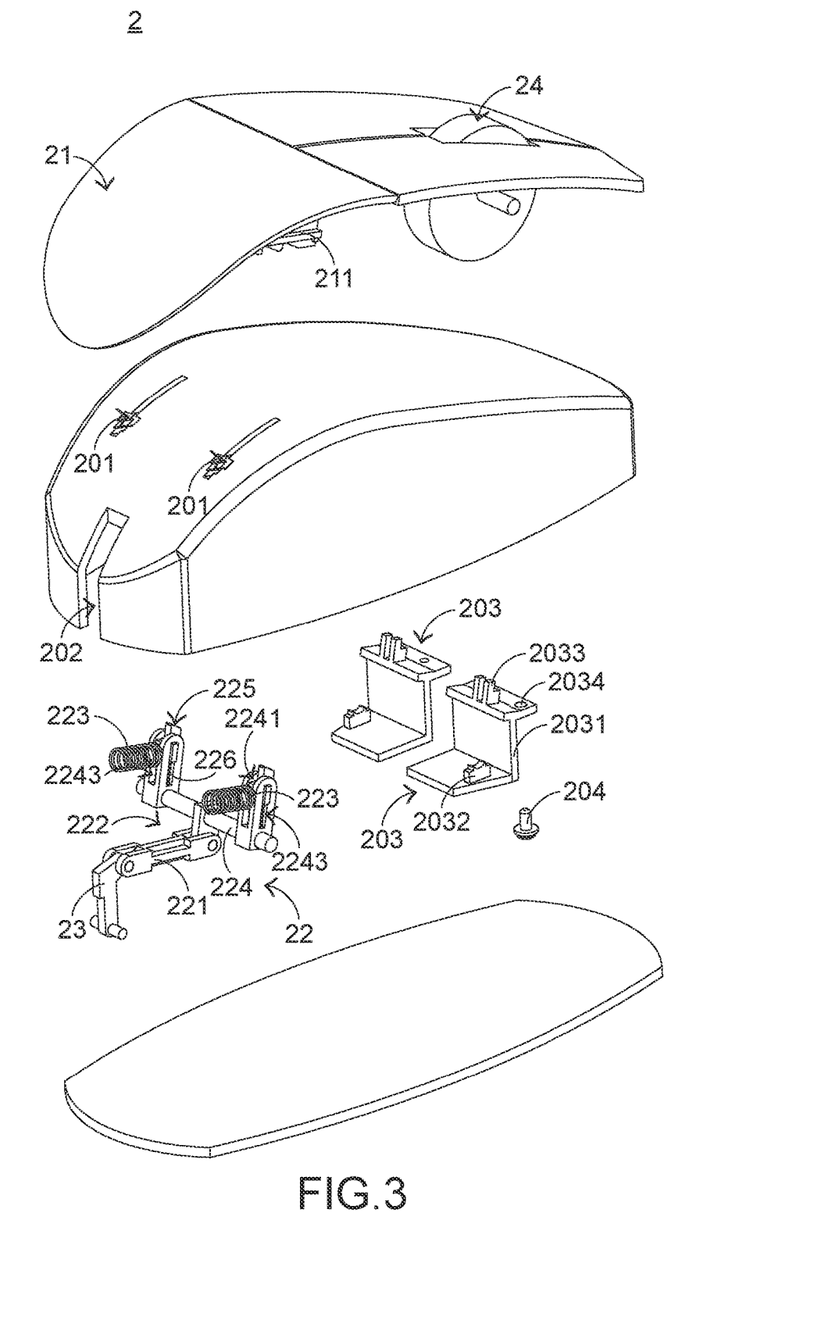
FIG. 3 is a schematic exploded view illustrating the mouse device according to an embodiment of the present invention.
Figure 4:
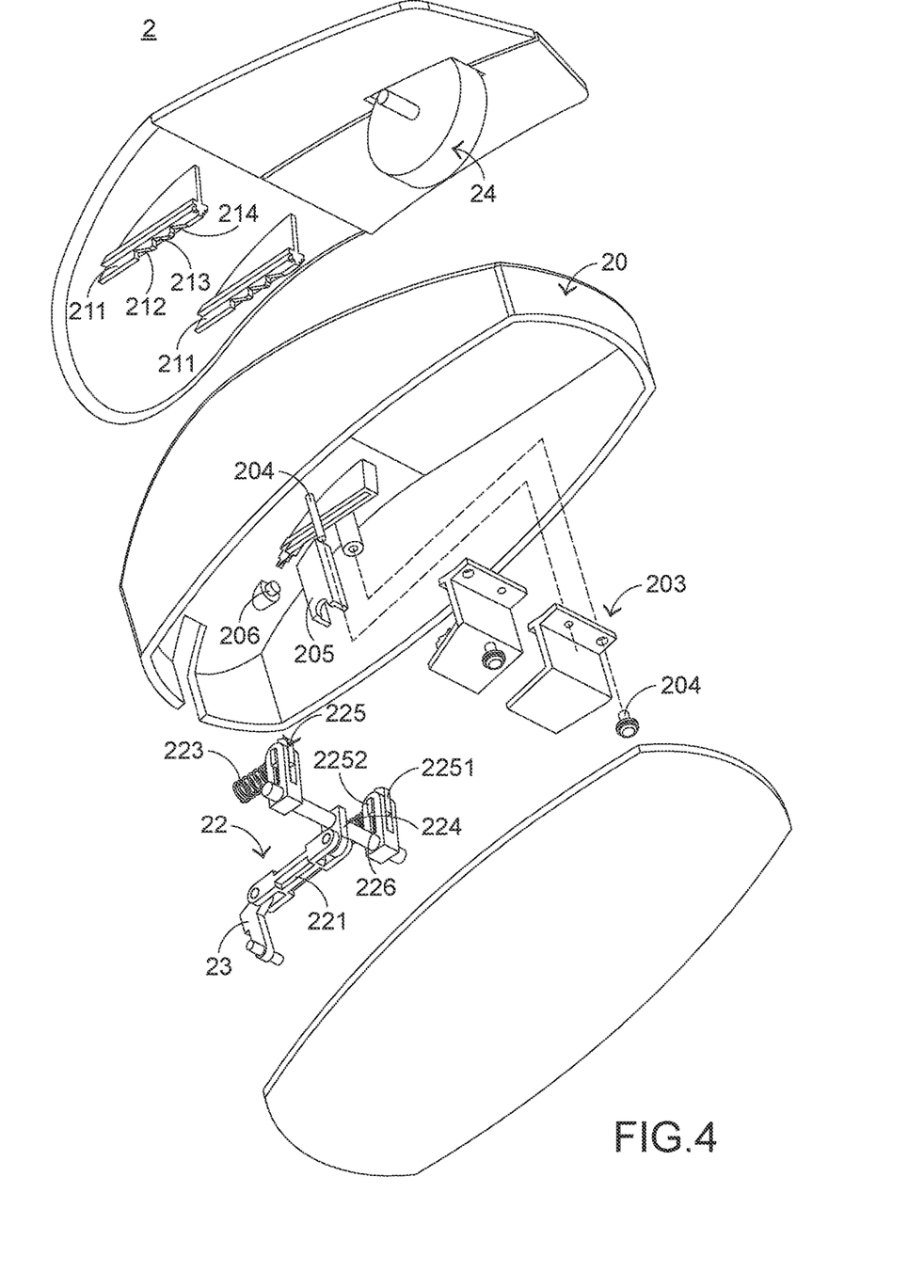
FIG. 4 is a schematic exploded view illustrating the mouse device according to the embodiment of the present invention and taken along another viewpoint.

Hereinafter, the structure of the mouse device of the present invention will be illustrated with reference to FIGS. 2, 3 and 4. FIG. 2 is a schematic perspective view illustrating a mouse device in a first status according to an embodiment of the present invention. FIG. 3 is a schematic exploded view illustrating the mouse device according to an embodiment of the present invention. FIG. 4 is a schematic exploded view illustrating the mouse device according to the embodiment of the present invention and taken along another viewpoint. The mouse device 2 is in communication with a computer system (not shown). Moreover, the mouse device 2 can be operated to control the movement of a cursor (not shown) of the computer system. The mouse device 2 comprises a casing 20, a top cover 21, an adjusting module 22, a pressing part 23 and an operation module 24. The casing 20 comprises plural first openings 201, a second opening 202 and plural brackets 203. The casing 20 is covered by the top cover 21. Moreover, the top cover 21 is movable relative to the casing 20. The top cover 21 comprises plural saw-toothed plates 211. The plural saw-toothed plates 211 are disposed on an inner surface of the casing 211. Moreover, the plural saw-toothed plates 211 are aligned with the corresponding first openings 201. The plural saw-toothed plates 211 are penetrated through the corresponding first openings 201 and inserted into an inner portion of the casing 20. Moreover, each saw-toothed plate 211 comprises a first graduation 212, a second graduation 213 and a third graduation 214. In this embodiment, the plural saw-toothed plates 211 are integrally formed with the top cover 21.

Please refer to FIGS. 3 and 4. The adjusting module 22 is disposed within the casing 20 and connected with the plural saw-toothed plates 211. While the plural saw-toothed plates 211 are moved with the adjusting module 22, the top cover 21 is moved relative to the casing 20. Preferably, the adjusting module 22 is engaged with the plural saw-toothed plates 211. The pressing part 23 is penetrated through the second opening 202 and exposed outside the second opening 202. Moreover, the pressing part 23 is connected with the adjusting module 22. While the pressing part 23 is pressed by the user, the pressing part 23 is correspondingly triggered. Consequently, the top cover 21 is moved to a first position P1 (see FIG. 2) or a second position P2 (see FIG. 8). In such way, the shape of the mouse device 2 is changed, and the mouse device 2 complies with the sizes of the palms of different users. The operation module 24 comprises a left button, a right button and a scroll wheel. The structures and functions of these components are similar to those of the conventional mouse device, and are not redundantly described herein.

The casing 20 further comprises plural first connecting parts 204, plural auxiliary posts 205 and plural protrusion posts 206. For succinctness, only one first connecting part 204, one auxiliary post 205 and one protrusion post 206 are shown in FIG. 4. The plural first connecting parts 204, the plural auxiliary posts 205 and the plural protrusion posts 206 are all disposed on the inner surface of the casing 20. The plural first connecting parts 204 are connected with the corresponding brackets 203. The plural auxiliary posts 205 and the plural protrusion posts 206 are contacted with corresponding components of the adjusting module 22 in order to assist in the adjusting module 22. The detailed connecting relationships between these components will be described as follows. In this embodiment, the plural first connecting parts 204, the plural auxiliary posts 205 and the plural protrusion posts 206 are integrally formed with the casing 20.

Figure 5:
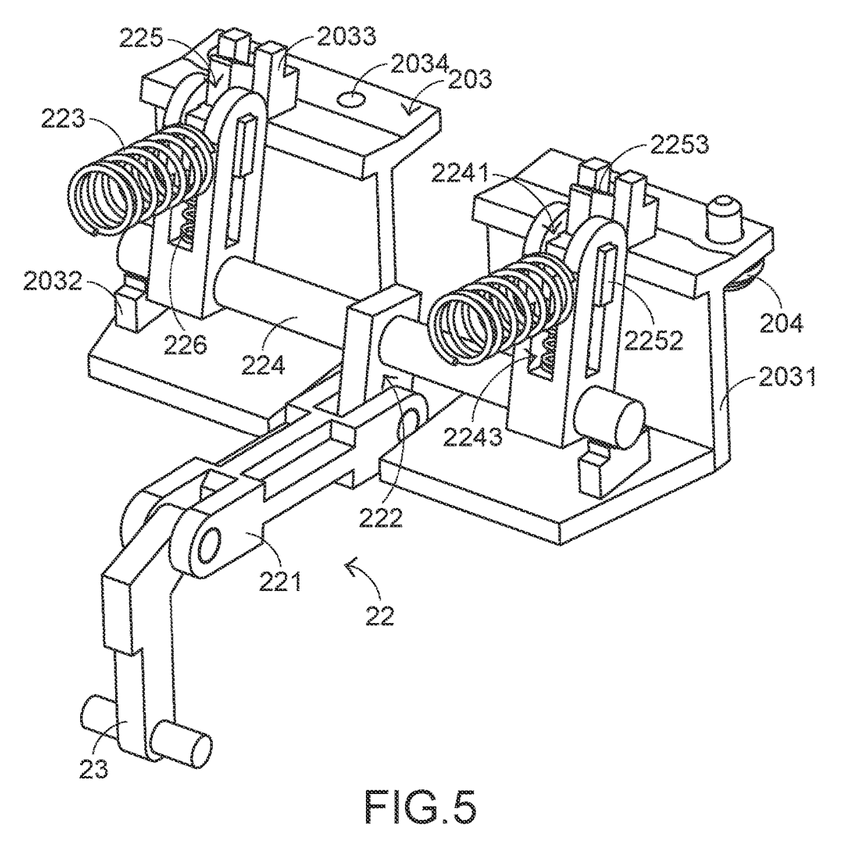
FIG. 5 is a schematic perspective view illustrating the combination of the pressing part, the adjusting module and the bracket of the keyboard module according to the embodiment of the present invention.
Figure 6:
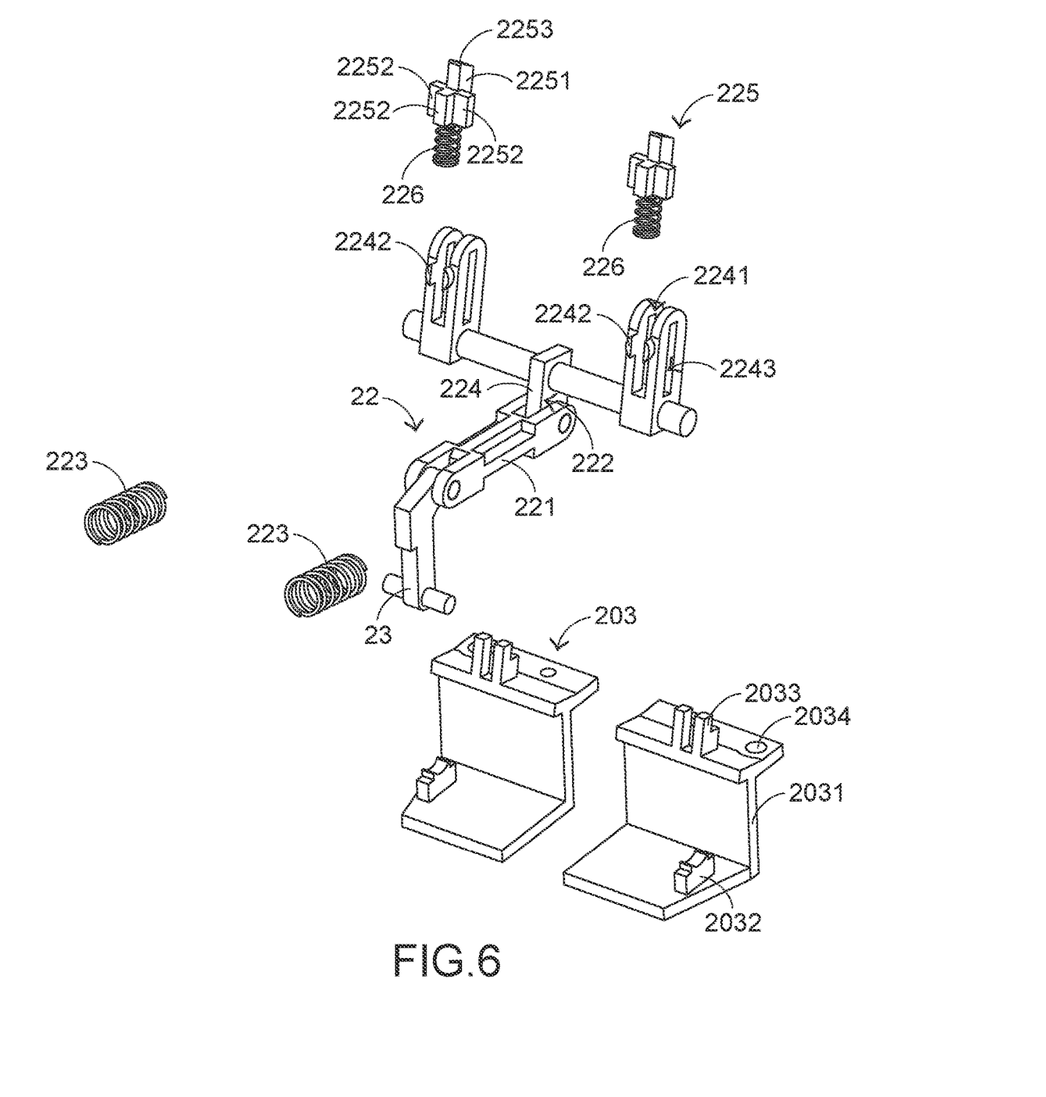
FIG. 6 is a schematic exploded view illustrating the combination of the pressing part, the adjusting module and the bracket of the keyboard module according to the embodiment of the present invention.

Hereinafter, the detailed structure of the adjusting module 22 will be described in more details with reference to FIGS. 3, 4, 5 and 6. FIG. 5 is a schematic perspective view illustrating the combination of the pressing part, the adjusting module and the bracket of the keyboard module according to the embodiment of the present invention. FIG. 6 is a schematic exploded view illustrating the combination of the pressing part, the adjusting module and the bracket of the keyboard module according to the embodiment of the present invention. The adjusting module 22 comprises a linkage lever 221, a coupling mechanism 222 and a position-returning element 223. The linkage lever 221 is connected with the pressing part 23. While the pressing part 23 is pressed, the linkage lever 221 is moved relative to the casing 20. A first end of the coupling mechanism 222 is connected with the linkage lever 221. A second end of the coupling mechanism 222 is connected with the plural saw-toothed plates 211. Moreover, the second end of the coupling mechanism 222 is received within the first graduations 212, the second graduations 213 or the third graduations 214 of the plural saw-toothed plates 211. A first end of the position-returning element 223 is connected with the coupling mechanism 222. A second end of the position-returning element 223 is contacted with the casing 20. The position-returning element 223 provides a second elastic force to the coupling mechanism 222. While the pressing part 23 is pressed to trigger the adjusting module 22, the second end of the coupling mechanism 222 is moved from the first graduation 212 to the second graduation 213, or the second end of the coupling mechanism 222 is moved from the second graduation 213 to the first graduation 212. The rest may be deduced by analogy.

The coupling mechanism 222 of the adjusting module 22 comprises a transmission element 224, plural movable elements 225 and plural elastic elements 226. The transmission element 224 is connected with the linkage lever 221 and rotatable relative to the linkage lever 221. The transmission element 224 comprises plural accommodation spaces 2241, plural fixing structures 2242 and plural position-limiting grooves 2243. The accommodation spaces 2241 are located near the corresponding saw-toothed plates 221. The fixing structures 2242 and the position-limiting grooves 2243 are located beside the corresponding accommodation spaces 2241. The movable elements 225 are located at the second end of the coupling mechanism 222 and accommodated within the corresponding accommodation spaces 2241. While the movable elements 225 are pushed by the saw-toothed plates 211, the movable elements 225 are moved within the corresponding accommodation spaces 2241. The elastic elements 226 are disposed within the corresponding accommodation spaces 2241 and contacted with the corresponding movable elements 225. The elastic elements 226 provide first elastic forces to the corresponding movable elements 225. Consequently, the movable elements 225 are movable within the corresponding accommodation spaces 2241 back and forth. For example, the elastic elements 226 are spiral springs.

In an embodiment, each movable element 225 comprises a contact part 2251 and plural bulges 2252. The contact part 2251 is disposed within the accommodation space 2241 and partially protruded out of the accommodation space 2241. Moreover, the contact part 2251 is inserted into the first graduation 212, the second graduation 213 or the third graduation 214 of the saw-toothed plate 211. The plural bulges 2252 are protruded from the contact part 2251 along different directions. Moreover, the plural bulges 2252 are inserted into the corresponding position-limiting grooves 2243. Due to the position-limiting grooves 2243, the movable element 225 is only allowed to be moved within the accommodation space 2241. Consequently, the movable element 225 is not escaped from the accommodation space 2241. Moreover, the contact part 2251 has a contact surface 2253. The contact surface 2251 can be inserted into the first graduation 212, the second graduation 213 or the third graduation 214. The surface of the contact surface 2253 of the contact part 2251 is complementary to the shape of each of the first graduation 212, the second graduation 213 and the third graduation 214. Consequently, the adjusting module 22 is engaged with the plural saw-toothed plates 211.

Please refer to FIGS. 3, 4 and 5. A first end of the position-returning element 223 is sheathed around the fixing structure 2242 of the transmission element 224. A second end of the position-returning element 223 is contacted with the protrusion post 206 of the casing 20. Consequently, the position-returning element 223 is disposed within the casing 20 to provide a second elastic force to the transmission element 224. For example, the position-returning element 223 is a spiral spring.

The plural brackets 203 are contacted with the transmission element 224 to support the transmission element 224. Consequently, the plural brackets 203 are rotatable relative to the plural brackets 203. The bracket 203 comprises a bracket body 2031, a supporting seat 2032, a position-limiting structure 2033 and a second connecting part 2034. The supporting seat 2032 is disposed on a first end of the bracket body 2031. The transmission element 224 is supported by the supporting seats 2032 and the auxiliary posts 205 of the casing 20 collaboratively. Consequently, the transmission element 224 is stably rotated relative to the linkage lever 221. The auxiliary posts 205 are located over the transmission element 224 to support the rotating shaft of the transmission element 224. The supporting seats 2032 are located under the transmission element 224 to support the rotating shaft of the transmission element 224. The position-limiting structure 2033 is disposed on a second end of the bracket body 2031. The corresponding saw-toothed plate 211 is partially received within the position-limiting structure 2033. Consequently, the saw-toothed plate 211 is allowed to be moved within the position-limiting structure 2033. The second connecting part 2034 of the bracket 203 is connected with the first connecting part 204 of the casing 20. Consequently, the bracket 203 is fixed on the casing 20. In an embodiment, the second connecting part 2034 is a perforation, and the first connecting part 204 is a fastening post or a screw. In case that the first connecting part 204 is a fastening post, the first connecting part 204 is penetrated through the perforation. In case that the first connecting part 204 is a screw, the first connecting part 204 is penetrated through the perforation and tightened into the casing 20.

Figure 7:
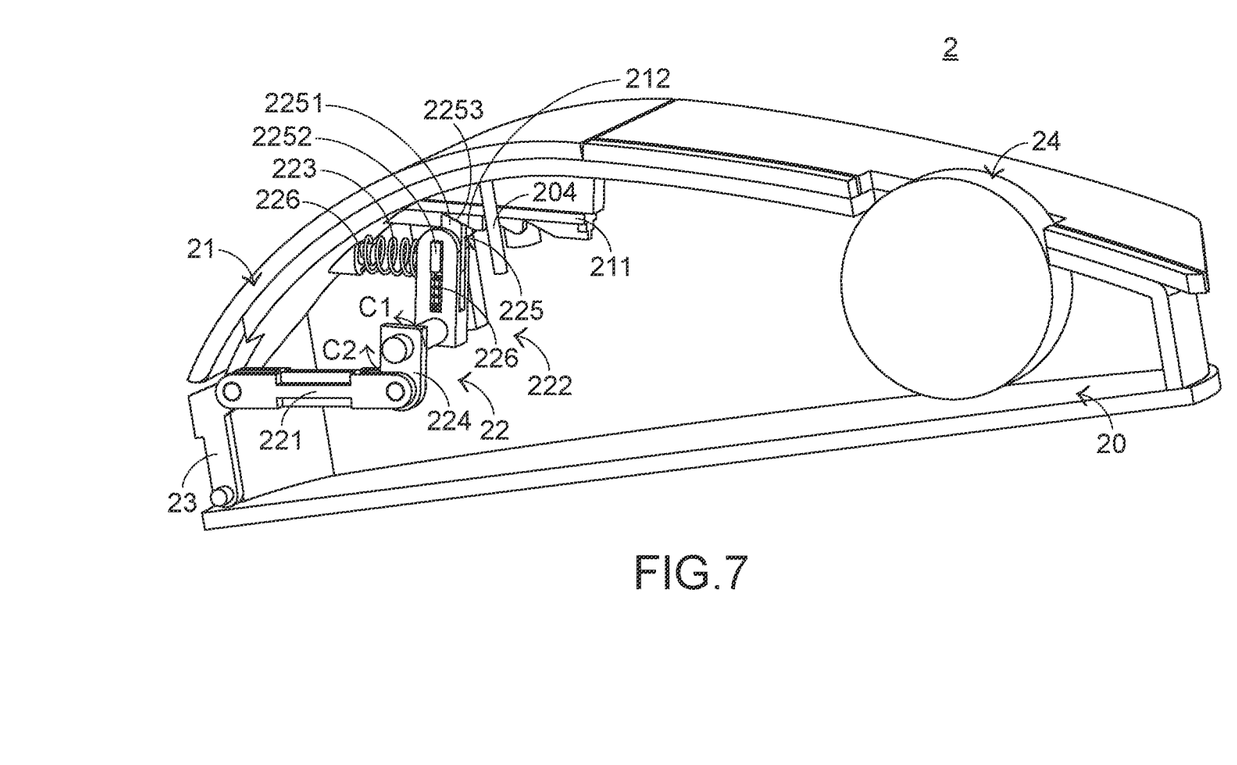
FIG. 7 is a schematic cutaway view illustrating the mouse device in the first status according to the embodiment of the present invention.

The operations of the mouse device 2 will be described as follows. Please refer to FIGS. 3, 4, 5, 6 and 7. FIG. 7 is a schematic cutaway view illustrating the mouse device in the first status according to the embodiment of the present invention. Initially, the mouse device 2 is in the first status. In the first status, the top cover 21 of the mouse device 2 is in a first position P1, and the mouse device 2 has the appearance as shown in FIG. 2. Meanwhile, the movable element 225 of the coupling mechanism 222 is inserted into the first graduation 212 of the saw-toothed plate 211.

In case that the user intends to change the shape of the mouse device 2, the user has to press the pressing part 23. As the pressing part 23 is swung relative to the casing 20, the linkage lever 221 is pushed by the pressing part 23. As the linkage lever 221 is moved, the transmission element 224 is rotated relative to the linkage lever 221 in a first direction C1. The transmission element 224 is supported by the auxiliary posts 205 and the supporting seats 2032 collaboratively. Consequently, the transmission element 224 is stably rotated relative to the linkage lever 221. As the transmission element 224 is rotated in the first direction C1, the movable elements 225 within the accommodation space 2241 are correspondingly swung in the first direction C1. Consequently, the saw-toothed plates 211 are pushed in the direction away from the casing 20, and the top cover 21 is moved relative to the casing 20. Moreover, as the transmission element 224 is rotated, the position-returning elements 223 are gradually compressed. While the top cover 221 is moved, the movable elements 225 are separated from the first graduations 212 and pushed downwardly by the saw-toothed plates 211. Consequently, the movable elements 225 are moved within the accommodation spaces 2241 to compress the corresponding elastic elements 226. That is, the movable elements 225 are disengaged from the first graduations 212 of the saw-toothed plates 211. As the top cover 21 is moved, the movable elements 225 are continuously pushed by the saw-toothed plates 211.

Figure 8:
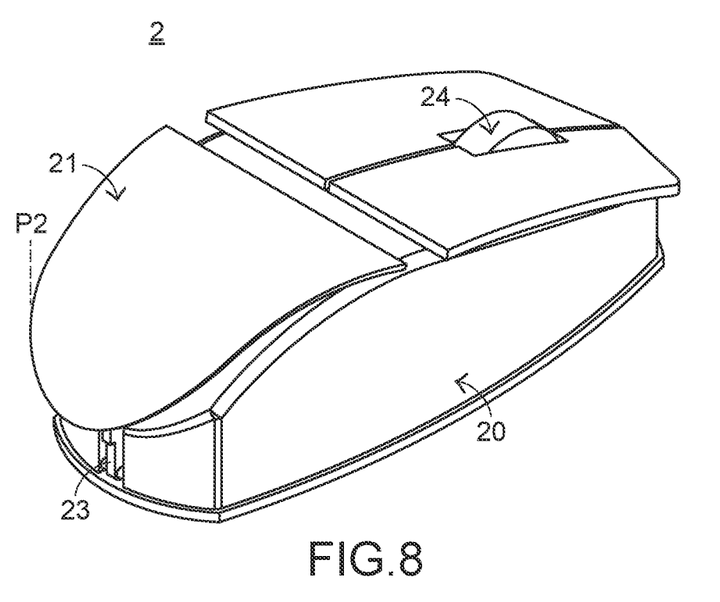
FIG. 8 is a schematic perspective view illustrating a mouse device in a second status according to the embodiment of the present invention.

When the pressing part 23 is no longer pressed by the user, the compressed position-returning elements 223 are returned to its original positions. At the same time, the position-returning elements 223 provide second elastic forces to the transmission element 224 in the direction toward the inner portion of the casing 20. Consequently, the transmission element 224 is rotated in a second direction C2, which is opposed to the first direction C1. As the transmission element 224 is rotated, the movable elements 225 are swung along the corresponding saw-toothed plates 211. Consequently, the movable elements 225 are moved to the position near the second graduations 213. As the compressed elastic elements 226 are returned to the original positions, the elastic elements 226 provide the first elastic forces to the corresponding movable elements 225 in the upward direction. Consequently, the movable elements 225 are moved upwardly within the accommodation spaces 2241. As the saw-toothed plates 211 and the movable elements 225 are moved, the movable elements 225 are inserted into the corresponding second graduations 213 and engaged with the corresponding saw-toothed plates 211 again. Meanwhile, the mouse device 2 is in a second status, and the top cover 21 of the mouse device 2 is in a second position P2. The appearance of the mouse device 2 in the second status is larger than the appearance of the mouse device 2 in the first status. In the second status, the mouse device 2 has the appearance as shown in FIG. 8. Under this circumstance, the mouse device 2 can be suitably operated by the user with a larger palm. While the transmission element 224 is rotated in the second direction C2, the linkage lever 221 is pushed by the transmission element 224. As the pressing part 23 is pushed by the linkage lever 221, the pressing part 23 is returned to the original position where the pressing part 23 is not pressed.

The process of moving the movable elements 225 from the second graduations 213 to the third graduations 214 is similar to the process of moving the movable elements 225 from the first graduations 212 to the second graduations 213, and is not redundantly described herein. When the movable elements 225 are inserted into the second graduations 213 or the third graduations 214, the user may provide a stronger force to press the pressing part 23. Since the transmission element 224 is rotated to a large extent, the movable elements 225 are moved to the positions near the first graduations 212. In response to the first elastic forces of the elastic elements 226, the movable elements 225 are gradually moved into the first graduations 212 of the saw-toothed plates 211. At the same time, the top cover 21 is pushed toward the casing 20 by the movable elements 225. Consequently, the top cover 21 is returned to the first position P1.

From the above descriptions, the present invention provides the mouse device. The movement of the top cover is controlled through the pressing part and the adjusting module. Consequently, the shape of the mouse is adjusted to comply with the requirements of different users. The pressing part and the transmission element, the movable element and the elastic element of the adjusting module are linked with each other. In response to the elastic force of the elastic element, the pressing part is returned to its original position. When compared with the conventional technology, the mouse device of the present invention is aesthetically-pleasing and more user-friendly. In other words, the mouse device of the present invention can overcome the drawbacks of the conventional technology.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising:
    a casing comprising a first opening and a second opening;
    a top cover, wherein the casing is covered by the top cover, and the top cover is movable relative to the casing, wherein the top cover comprises a saw-toothed plate that is disposed on an inner surface of the top cover, and the saw-toothed plate is penetrated through the first opening and inserted into an inner portion of the casing;
    an adjusting module disposed within the casing and connected with the saw-toothed plate, wherein when the saw-toothed plate is moved with the adjusting module, the top cover is correspondingly moved relative to the casing; and
    a pressing part penetrated through the second opening, exposed outside the second opening and connected with the adjusting module, wherein when the pressing part is pressed to trigger the adjusting module, the top cover is moved to a first position or a second position, so that a shape of the mouse device is changed.

2. The mouse device according to claim 1, wherein the adjusting module comprises:
    a linkage lever connected with the pressing part, wherein while the pressing part is pressed, the linkage lever is moved relative to the casing; and
    a coupling mechanism, wherein a first end of the coupling mechanism is connected with the linkage lever, and a second end of the coupling mechanism is connected with the saw-toothed plate, so that the second end of the coupling mechanism is disposed within a first graduation or a second graduation of the saw-toothed plate, wherein while the pressing part is pressed to trigger the adjusting module, the second end of the coupling mechanism is moved from the first graduation to the second graduation or from the second graduation to the first graduation.

3. The mouse device according to claim 2, wherein the coupling mechanism comprises:
    a transmission element connected with the linkage lever and rotatable relative to the linkage lever, wherein the transmission element comprises an accommodation space and a fixing structure, and the accommodation space is located near the saw-toothed plate;
    a movable element located at the second end of the coupling mechanism and accommodated within the accommodation space, wherein while the movable element is pushed by the saw-toothed plate, the saw-toothed plate is moved within the accommodation space; and
    an elastic element disposed within the accommodation space and contacted with the movable element, wherein the elastic element provides a first elastic force to the movable element.

4. The mouse device according to claim 3, wherein while the pressing part is pressed, the linkage lever is pushed by the pressing part, so that the transmission element is rotated relative to the linkage lever and the movable element is swung, wherein as the movable element is swung to the push the saw-toothed plate, the top cover is moved relative to the casing and the movable element is disengaged from the first graduation and pushed by the saw-toothed plate, so that the movable element is moved within the accommodation space to compress the elastic element, wherein when the elastic element is restored to an original shape, the movable element is moved within the accommodation space and inserted into the second graduation of the saw-toothed plate.

5. The mouse device according to claim 3, wherein the adjusting module further comprises a position-returning element, wherein a first end of the position-returning element is sheathed around the fixing structure, a second end of the position-returning element is contacted with the casing, and the position-returning element provides a second elastic force to the transmission element, wherein in response to the second elastic force, the transmission element is rotated relative to the casing to push the linkage lever, and the pressing part is returned to an original position.

6. The mouse device according to claim 3, wherein the transmission element further comprises a position-limiting groove, wherein the movable element is inserted into the position-limiting groove, so that the movable element is only allowed to be moved within the accommodation space.

7. The mouse device according to claim 6, wherein the movable element comprises:
   a contact part disposed within the accommodation space and partially protruded out of the accommodation space, wherein the contact part is inserted into the first graduation or the second graduation of the saw-toothed plate; and
   a bulge protruded from the contact part and inserted into the position-limiting groove, so that the movable element is not escaped from the accommodation space.

8. The mouse device according to claim 7, wherein a shape of a contact surface of the contact part is complementary to a shape of the first graduation.

9. The mouse device according to claim 3, wherein the casing further comprises a bracket, wherein the bracket is contacted with the transmission element, and the transmission element is supported by the bracket, so that the transmission element is rotatable relative to the bracket, wherein the bracket comprises:
   a bracket;
   a supporting seat disposed on a first end of the bracket body so as to support the transmission element; and
   a position-limiting structure disposed on a second end of the bracket body, wherein the saw-toothed plate is partially received within the position-limiting structure, so that the saw-toothed plate is movable within the position-limiting structure.

10. The mouse device according to claim 9, wherein the casing further comprises:
   a first connecting part disposed on an inner surface of the casing; and
   an auxiliary post disposed on the inner surface of the casing, wherein the transmission element is supported by the auxiliary post and the supporting seat collaboratively, wherein the bracket further comprises a second connecting part, and the second connecting part and the first connecting part are connected with each other, so that the bracket is fixed within the casing.

* * * * *